United States Patent
Bonfanti et al.

(10) Patent No.: US 8,426,758 B2
(45) Date of Patent: Apr. 23, 2013

(54) MEDIUM VOLTAGE SWITCH UNIT

(75) Inventors: Alessandro Bonfanti, Alzano Lombardo (IT); Davide Corti, Nembro (IT)

(73) Assignee: ABB Technology AG, Zurich (CH)

( * ) Notice: Subject to any disclaimer, the term of this patent is extended or adjusted under 35 U.S.C. 154(b) by 293 days.

(21) Appl. No.: 12/990,592

(22) PCT Filed: May 4, 2009

(86) PCT No.: PCT/EP2009/055356
§ 371 (c)(1),
(2), (4) Date: Dec. 1, 2010

(87) PCT Pub. No.: WO2009/135817
PCT Pub. Date: Nov. 12, 2009

(65) Prior Publication Data
US 2011/0078357 A1 Mar. 31, 2011

(30) Foreign Application Priority Data
May 6, 2008 (EP) ..................... 08155749

(51) Int. Cl.
*H01H 33/00* (2006.01)
(52) U.S. Cl.
USPC ............ 218/2; 218/4; 218/6; 218/12; 218/45; 218/67; 218/80; 218/100
(58) Field of Classification Search .... 200/48 R–48 CB, 200/17 R, 334, 50.32, 50.37, 50.39; 218/1–9, 218/12, 45, 55, 67, 69, 79, 80, 100
See application file for complete search history.

(56) References Cited

U.S. PATENT DOCUMENTS
3,399,286 A * 8/1968 Kerr, Jr. ........................ 218/10
4,250,535 A * 2/1981 Adolph et al. ................ 361/618

(Continued)

FOREIGN PATENT DOCUMENTS
DE 3536763 A1 4/1987
DE 4216970 A1 12/1993
(Continued)

OTHER PUBLICATIONS
Decision on Grant dated Jan. 25, 2013 issued in Russian Application No. 2010149600/07(071690).

*Primary Examiner* — Michael Friedhofer
(74) *Attorney, Agent, or Firm* — Novak Druce Connolly Bove + Quigg LLP

(57) ABSTRACT

A medium voltage switch unit comprising an interruption unit and a disconnection unit, wherein the interruption unit comprises a first and a second interruption contact and a first drive unit which moves one of said interruption contacts between a first position in which they are in electrical connection and a second position in which they are spaced apart. The disconnection unit comprises a first and a second fixed disconnection contacts couplable and uncouplable with respective first and second movable disconnection contacts mounted on the interruption unit and electrically connected to the first interruption contact. The interruption unit is mechanically supported by a first fixed conductor and the second interruption contact is electrically connected to said first fixed conductor. The disconnection unit comprises a second drive unit which moves the interruption unit, relative to said first conductor, between: a first disconnector position in which the first movable disconnection contact and the first fixed disconnection contact are coupled while the second movable disconnection contact is isolated from said second fixed disconnection contact; a second disconnector position in which the first and second movable disconnection contacts are isolated from the first and second fixed disconnection contacts; and a third disconnector position in which the second movable disconnection contact and the second fixed disconnection contact are coupled while the first movable disconnection contact is isolated from said first fixed disconnection contact.

20 Claims, 9 Drawing Sheets

U.S. PATENT DOCUMENTS

| | | | | |
|---|---|---|---|---|
| 4,484,044 | A * | 11/1984 | Yoshigae | 218/3 |
| 4,736,114 | A * | 4/1988 | Reichl | 307/11 |
| 6,268,579 | B1 * | 7/2001 | Kajiwara et al. | 218/153 |
| 6,680,453 | B2 * | 1/2004 | Rokunohe et al. | 218/2 |
| 7,679,019 | B2 * | 3/2010 | Bodenstein et al. | 218/2 |
| 2001/0025828 | A1 * | 10/2001 | Gutalj | 218/79 |

FOREIGN PATENT DOCUMENTS

| | | |
|---|---|---|
| EP | 1164609 A1 | 12/2001 |
| RU | 67345 U1 | 10/2007 |

* cited by examiner

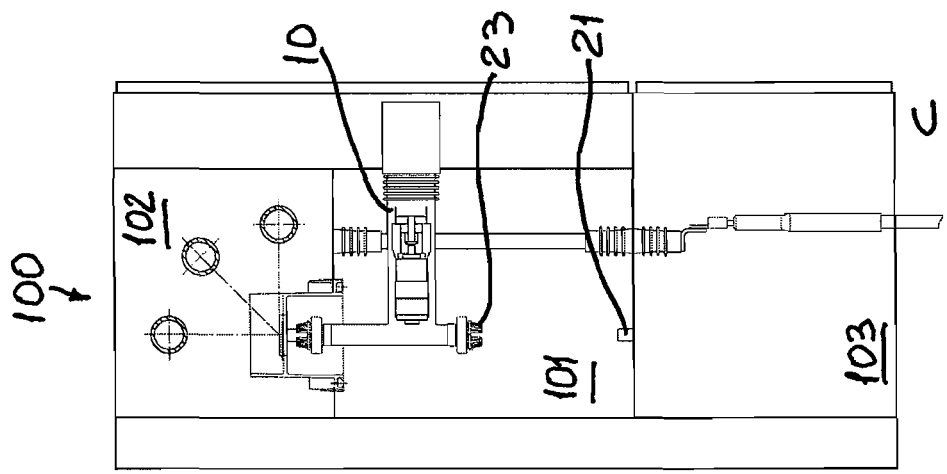
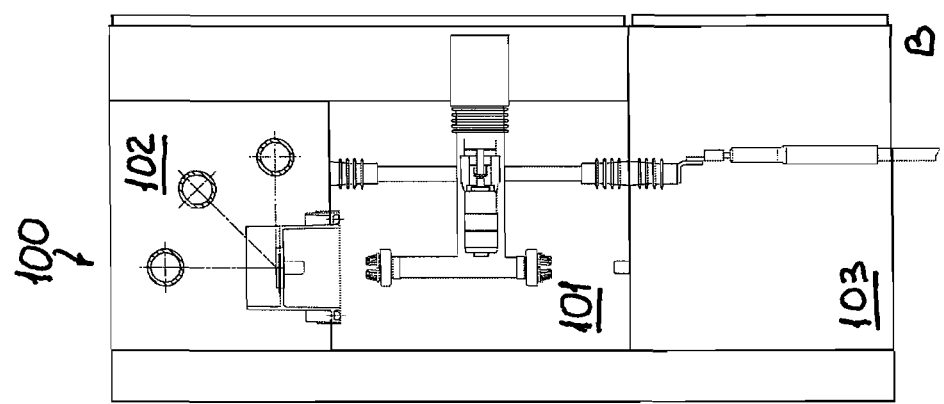
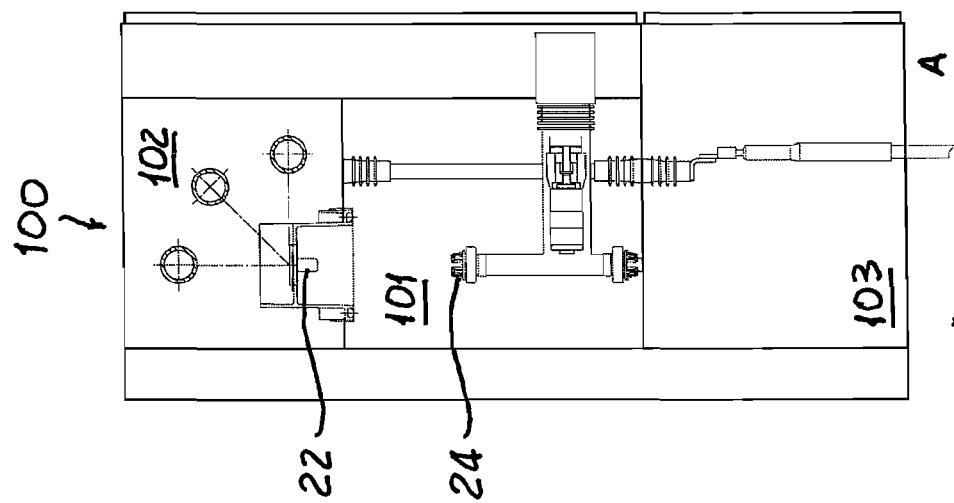
Fig. 4

MEDIUM VOLTAGE SWITCH UNIT

CROSS REFERENCE TO RELATED APPLICATIONS

This application is a National Phase filing under 35 U.S.C. §371 of PCT/EP2009/055356 filed on May 4, 2009; and this application claims priority to Application No. 08155749.8 filed in Europe on May 6, 2008 under 35 U.S.C. §119; the entire contents of all are hereby incorporated by reference.

The present invention relates to a medium voltage switch unit, in particular a medium voltage switch that combines in a very compact manner the interruption and disconnection functions. The medium voltage switch unit of the invention is conveniently used in Medium Voltage panels, particularly in air insulated (AIS) Medium Voltage panels. For the purposes of the present application the term Medium Voltage is referred to applications in the range of between 1 and 50 kV.

Medium voltage panels are well known in the art and an example of them is schematically represented in FIG. 9. They usually consist of a casing 90 that is internally divided into a circuit breaker compartment 92, a bus-bar compartment 93, a cable compartment 94, and a control cabinet 95.

A circuit breaker 91 is normally positioned inside the circuit breaker compartment 92, said circuit breaker being movable between a service position, in which it is connected to the bus-bar and cable systems, and a test/disconnected position (as shown in FIG. 9) in which it is isolated from the bus-bar and cable systems. To this end, the circuit breaker 91 is provided, for each phase, with a couple of contacts 96 and 97 that can be engaged/disengaged from corresponding stationary contacts 98 and 99 positioned in the bus-bar and cable compartments 93, 94 and facing the circuit breaker compartment 92.

The bus-bar compartment 93 houses a bus-bar system (not shown in FIG. 9) in which each bus-bar is connected to a corresponding stationary contact 98 for connection with the circuit breaker 91, via the corresponding contact 96. Similarly, the cable compartment 94 houses a cable connection system (also not shown) in which each cable is connected to a corresponding stationary contact 99 for connection with circuit breaker 91, via the corresponding contact 97.

Depending on the intended applications, the cable compartment generally also houses a number of different components and apparatuses, such as current transformers, voltage transformers and earthling switches which can be used with a manual or motor-operated mechanism, as well as other additional or alternative components.

The internal volume of the compartments need therefore to be designed so as to allow installation of the various components. At the same time, the need of having standardization, both in terms of production and installations, does not allow to tailor the size of the compartments, and consequently of the panels, according to the needs and the number of components to be housed in the panel. This is somehow in contrast with the need of keeping width and floor occupancy of the panel at a minimum level so as to reduce the overall dimensions of the switchgear inside the installation room.

It should also be noted that the presence of an earthing switch inside the cable compartment, in addition to require some dedicated internal space, also requires dedicated manual or motor-operated actuation systems and a series of mechanical interlocks, with a consequent increase of complexity of the panel as well as manufacturing and installation costs thereof.

It is therefore an object of the present invention to provide a medium voltage switch unit in which the above-mentioned drawbacks are avoided or at least reduced.

More in particular, it is an object of the present invention to provide a medium voltage switch unit in which the interruption and disconnection operations can be can be carried out very easily and with a reduced number of components thereby allowing to minimize the occupied space inside the panel.

As a further object, the present invention is aimed at providing a medium voltage switch unit having a reduced number of mechanical parts.

Still another object of the present invention is to provide a medium voltage switch unit with reduced manufacturing and installation costs.

Thus, the present invention relates to a Medium Voltage switch unit comprising an interruption unit and a disconnection unit, wherein the interruption unit comprises a first and a second interruption contact and a first drive unit which moves at least one of said first and second interruption contacts between a first position in which they are in electrical connection and a second position in which they are spaced apart. In the Medium Voltage switch unit according to the invention, the disconnection unit comprises a first and a second fixed disconnection contacts couplable and uncouplable with respective first and second movable disconnection contacts mounted on said interruption unit and electrically connected to said first interruption contact, said interruption unit being mechanically supported by a first fixed conductor and said second interruption contact being electrically connected to said first fixed conductor; the disconnection unit comprises a second drive unit which moves said interruption unit, relative to said first conductor, between: a first disconnector position in which the first movable disconnection contact and the first fixed disconnection contact are coupled while the second movable disconnection contact is isolated from said second fixed disconnection contact; a second disconnector position in which said first and second movable disconnection contacts are isolated from said first and second fixed disconnection contacts; and a third disconnector position in which the second movable disconnection contact and the second fixed disconnection contact are coupled while the first movable disconnection contact is isolated from said first fixed disconnection contact.

In this way, it is possible to overcome some of the disadvantages and drawbacks of the panels of the known art. The particular positioning of the fixed and movable disconnection contacts, the possibility of moving the interruption unit among three different positions, and the fact the interruption unit is mechanically supported by a fixed conductor, allow to carry out a number of electrical operation (as better defined hereinafter) without having to install an earthing switch and related operating mechanism inside the cable compartment. Consequently, the space demand inside the cable compartment is reduced, thereby allowing a more rational distribution of the total volume of the panel among the various compartments. As a result, the width and floor occupancy of the panel is reduced with respect to similar panel of the prior art.

Also the number of components and operating parts is reduced, since it is no longer necessary to have an earthing switch and the corresponding motor or manual-operated actuation systems and mechanical interlocks with Circuit Breaker, with a consequent reduction of manufacturing, installation and maintenance costs.

In a further aspect, the present invention also relates to a Medium Voltage panel including a Medium Voltage switch unit having the above-described features.

Further characteristics and advantages of the invention will emerge from the description of preferred, but not exclusive embodiments of the panel according to the invention, non-limiting examples of which are provided in the attached drawings, wherein:

FIG. 4 shows a lateral view of the medium voltage switch unit and panel of FIG. 2 represented in three different operating conditions

Figure 1:
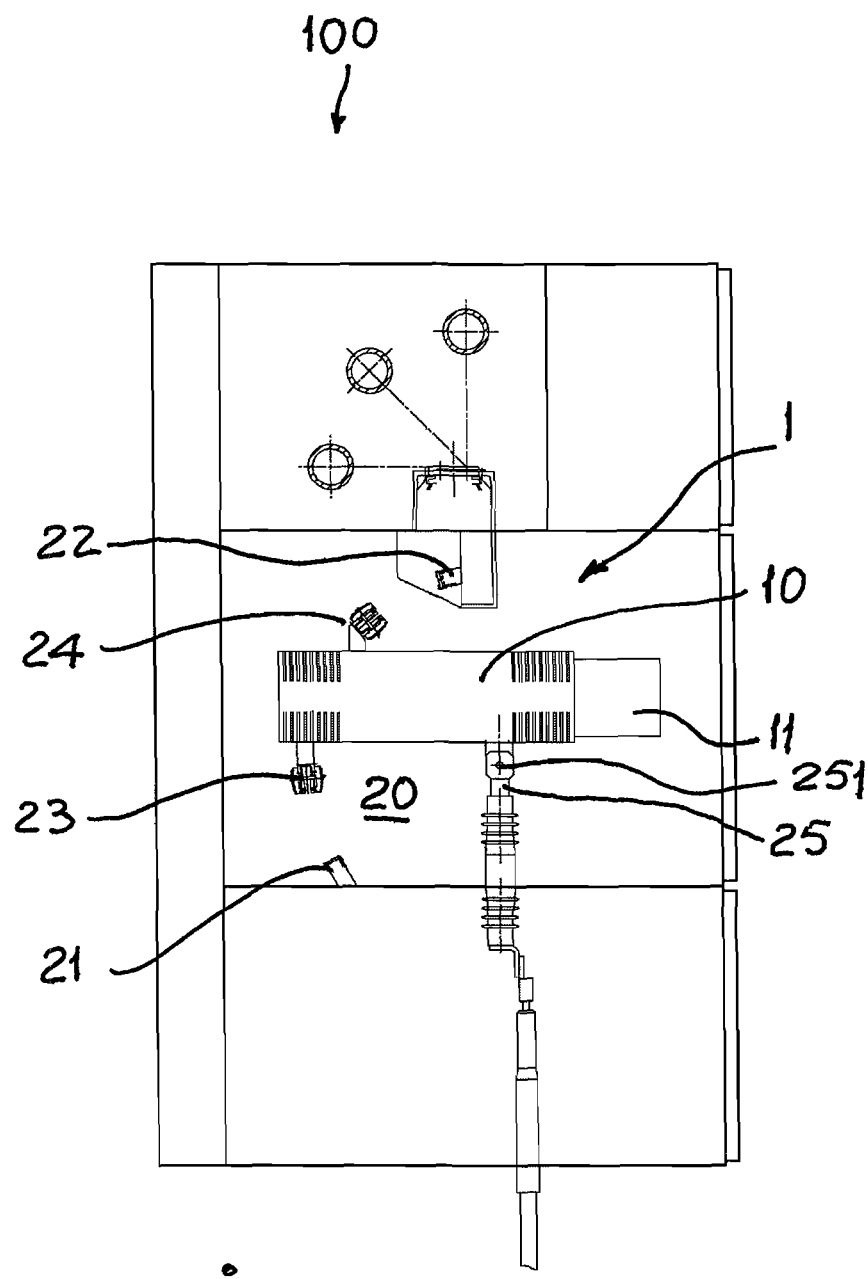
FIG. 1 is a lateral view of a first embodiment of a medium voltage switch unit according to the invention installed in a medium voltage panel.

With reference to FIGS. 1-8, a Medium Voltage switch unit 1 comprises, for each phase, an interruption unit 10 having a first and a second interruption contact (not shown) and a first drive unit 11 which moves at least one of said first and second interruption contacts between a first position in which they are in electrical connection and a second position in which they are spaced apart. In practice, the interruption unit can be a circuit breaker or a contactor of known type, e.g. a vacuum circuit breaker, and will not be described in details.

One of the characteristics of the Medium Voltage switch unit 1 according to the invention consists in that it also comprises a disconnection unit 20 which comprises, for each phase, a first 21 and a second 22 fixed disconnection contacts. The disconnection unit 20 also comprises, for each phase, first 23 and second 24 movable disconnection contacts which are mounted on said interruption unit 10 and electrically connected to said first interruption contact. A further characteristics of the Medium Voltage switch unit 1 according to the invention consists in that the interruption unit 10 is mechanically supported by a first fixed conductor 25 and said second interruption contact is electrically connected to said first fixed conductor 25.

Thus, for three-phase applications, the disconnection unit 20 will have three couples of fixed disconnections contacts 21 and 22. At the same time three couples of movable disconnections contacts 23 and 24 will be mounted on corresponding three interruption units 10, each of them being mechanically supported by a corresponding fixed conductor 25 electrically connected to the second interruption contact of the interruption unit.

A further characteristics of the medium voltage switch unit according to the invention is that the interruption unit 10 is movable between three positions. To this end, with particular reference to FIGS. 2 and 4, the disconnection unit 20 comprises a second drive unit 32 which moves the interruption unit 10, relative to said first fixed conductor 25, between:

(A) a first disconnector position in which the first movable disconnection contact 23 and the first fixed disconnection contact 21 are coupled with each other while the second movable disconnection 24 contact is isolated from said second fixed disconnection contact 22;

(B) a second disconnector position in which said first and second movable disconnection contacts 23 and 24 are isolated from said first and second fixed disconnection contacts 21 and 22;

(C) a third disconnector position in which the second movable disconnection contact 24 and the second fixed disconnection contact 22 are coupled with each other while the first movable disconnection contact 23 is isolated from said first fixed disconnection contact 21.

The three positions of the interruption unit 10, and the corresponding connection/disconnection of the contacts 21 and 22 with the respective contacts 23 and 24, brings about to three different operating conditions that will be better described later.

In a preferred embodiment of the Medium Voltage switch unit 1 according to the invention, the first fixed disconnection contact 21 is grounded, the second fixed disconnection contact 22 is electrically connected to a bus-bar system, and the first fixed conductor 25 is connected to a load. In this way, by moving the interruption unit between the first, second and third disconnector position it is possible to achieve three different operating conditions of the disconnection unit, i.e. grounded, test/disconnected, and service.

As a first alternative, embodiments of which are shown in FIGS. 1, 2, 5, 6, and 8, the interruption unit 10 is pivotally mounted on said first fixed conductor 25. To this purpose, the interruption unit 10 is preferably mounted on said first fixed conductor 25 so as to rotate around a pivot point 251, thereby achieving said first (A), second (B), and third (C) position.

Figure 2:
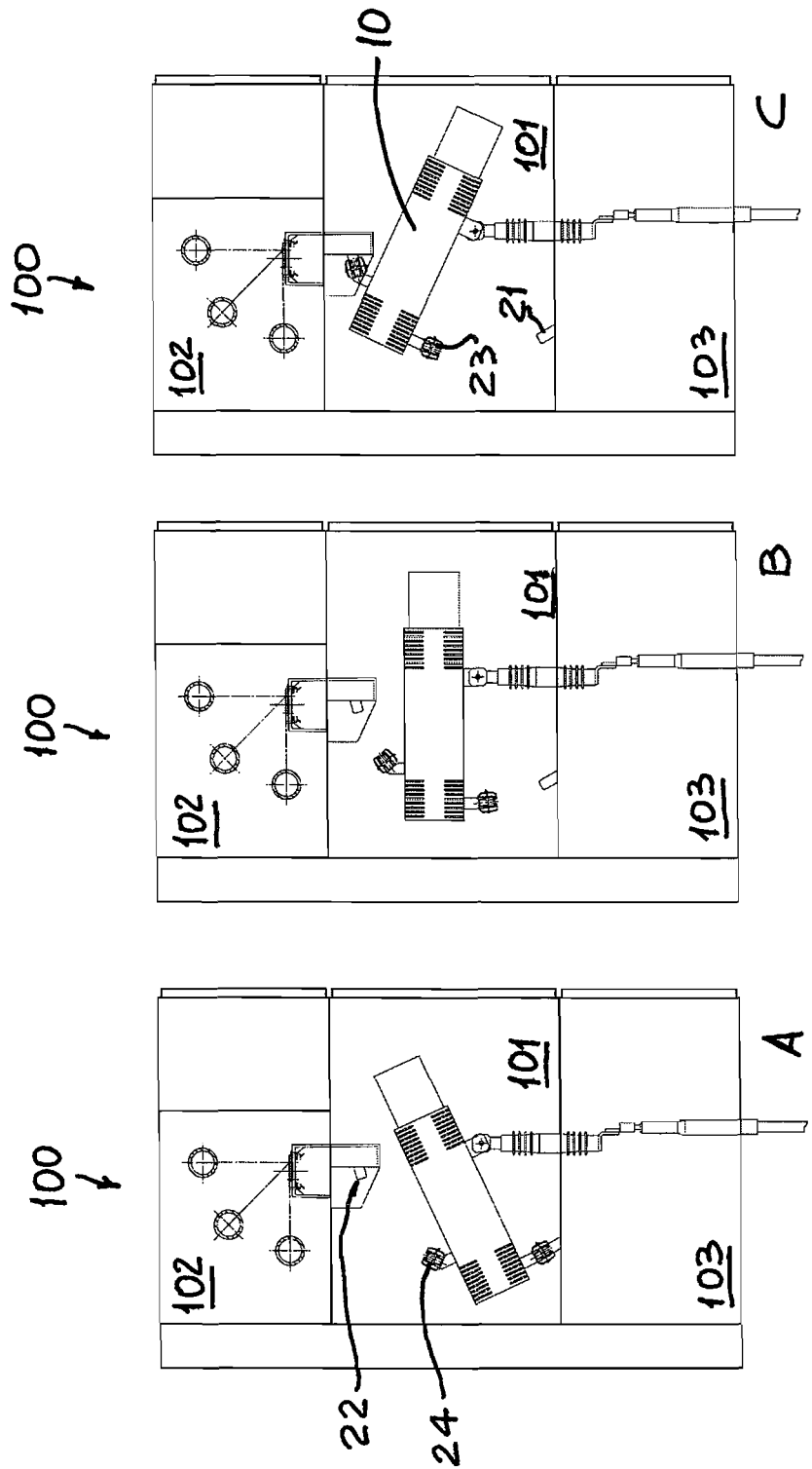
FIG. 2 shows a lateral view of the medium voltage switch unit and panel of FIG. 1 represented in three different operating conditions.

The typical operating sequence in this case is shown in details in FIG. 2. In position (A), the first movable disconnection contact 23 is coupled to the corresponding first fixed disconnection contact 21 which is grounded, while the second movable disconnection contact 24 is spaced part from the corresponding second fixed disconnection contact 22. Proper positioning and relative distance of the contacts 22 and 24 are designed so as to achieve their isolation, thereby achieving the grounded condition of the system.

By rotating the interruption unit 10 of an angle, e.g. between 20° and 30°, the interruption unit 10 is positioned in position (B), in which the first and second movable disconnection contact 23 and 24 are spaced part and isolated from the corresponding first and second fixed disconnection contact 21 and 22, thereby achieving the test/disconnected condition of the system.

By further rotating the interruption unit 10 of an angle, e.g. between 20° and 30°, the interruption unit 10 is then positioned in position (C), in which the second movable disconnection contact 24 is coupled to the corresponding second fixed disconnection contact 22 which is connected to a busbar system, while the first movable disconnection contact 23 is spaced part from the corresponding first fixed disconnection contact 21. Proper positioning and relative distance of the contacts 21 and 22 are designed so as to achieve their isolation, thereby achieving the service condition of the system.

Figure 6:
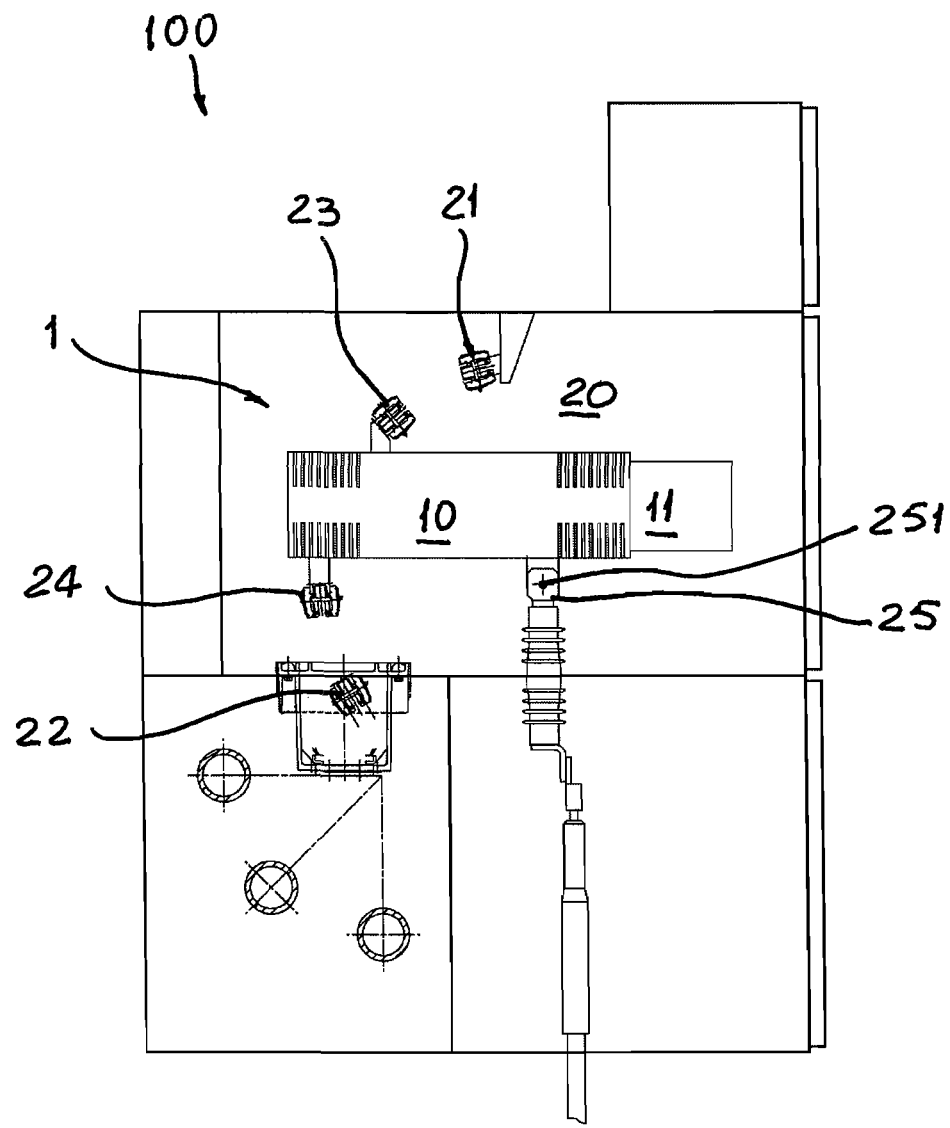
FIG. 6 is a lateral view of a fourth embodiment of a medium voltage switch unit according to the invention installed in a medium voltage panel.

In the embodiments of FIGS. 1, 2 and 6, the interruption unit 10 is mounted on the first fixed conductor so as to achieve an horizontal positioning in one of the three positions (A, B, or C) or during the movement between them. In particular, according to the embodiments of the figures referred to above, the interruption unit 10 achieves an horizontal positioning in correspondence of the test/disconnect position (B).

For the purposes of the present invention, the term horizontal refers to the medium voltage switch unit when mounted in a panel in operating conditions, either floor-positioned or wall-mounted.

Figure 5:
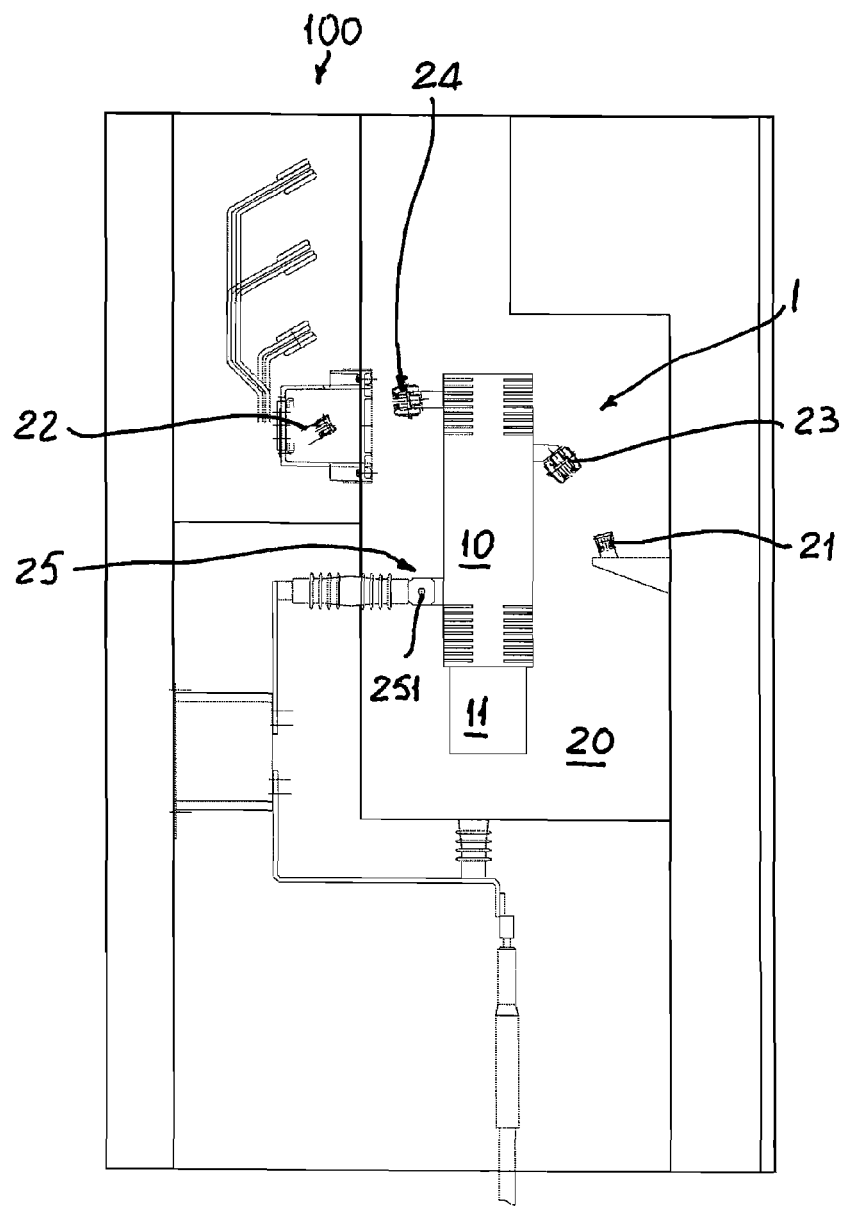
FIG. 5 is a lateral view of a third embodiment of a medium voltage switch unit according to the invention installed in a medium voltage panel.
Figure 8:
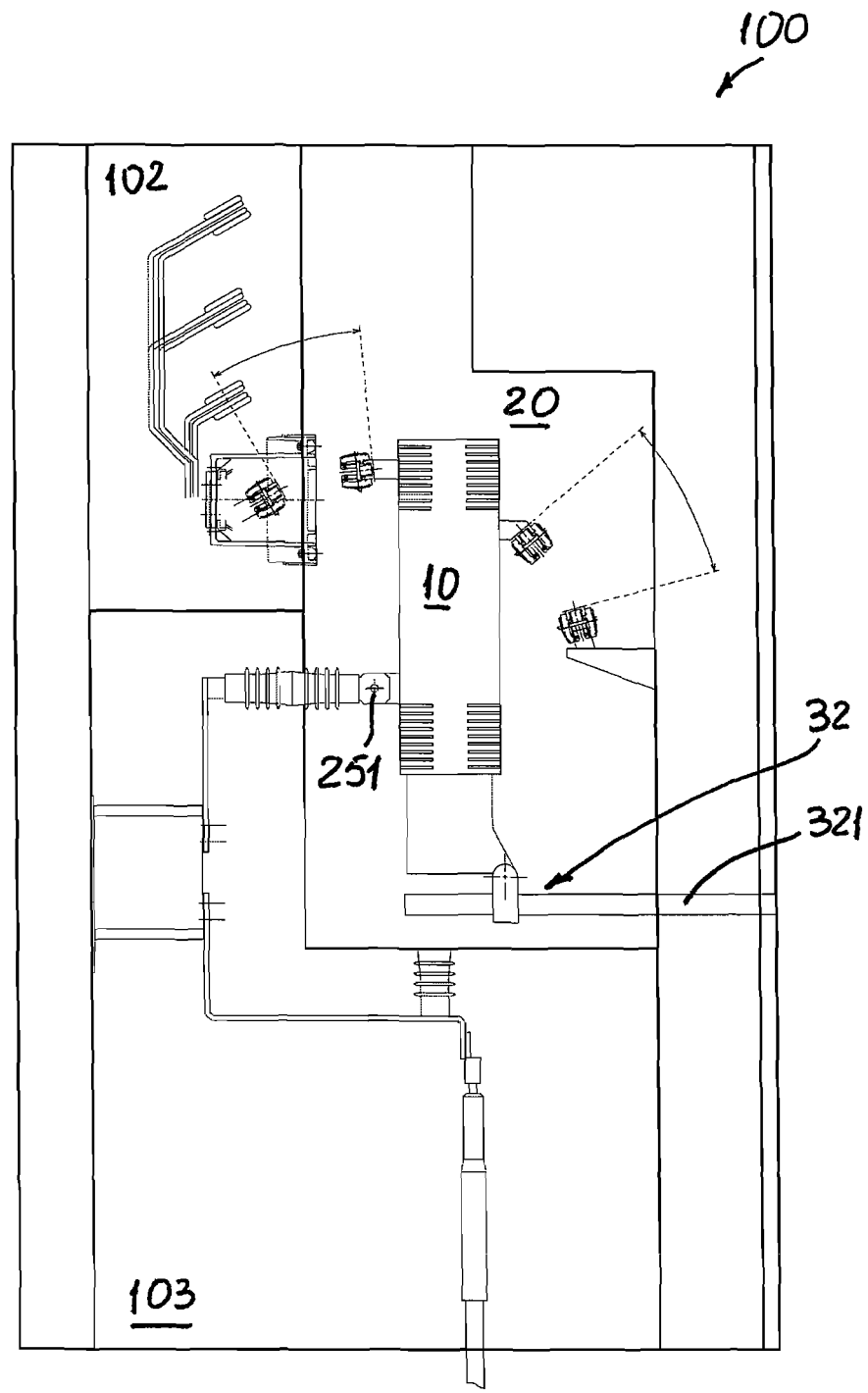
FIG. 8 is a lateral view of a second possible embodiment of a disconnection drive unit for the medium voltage switch according to the invention.
Figure 9:
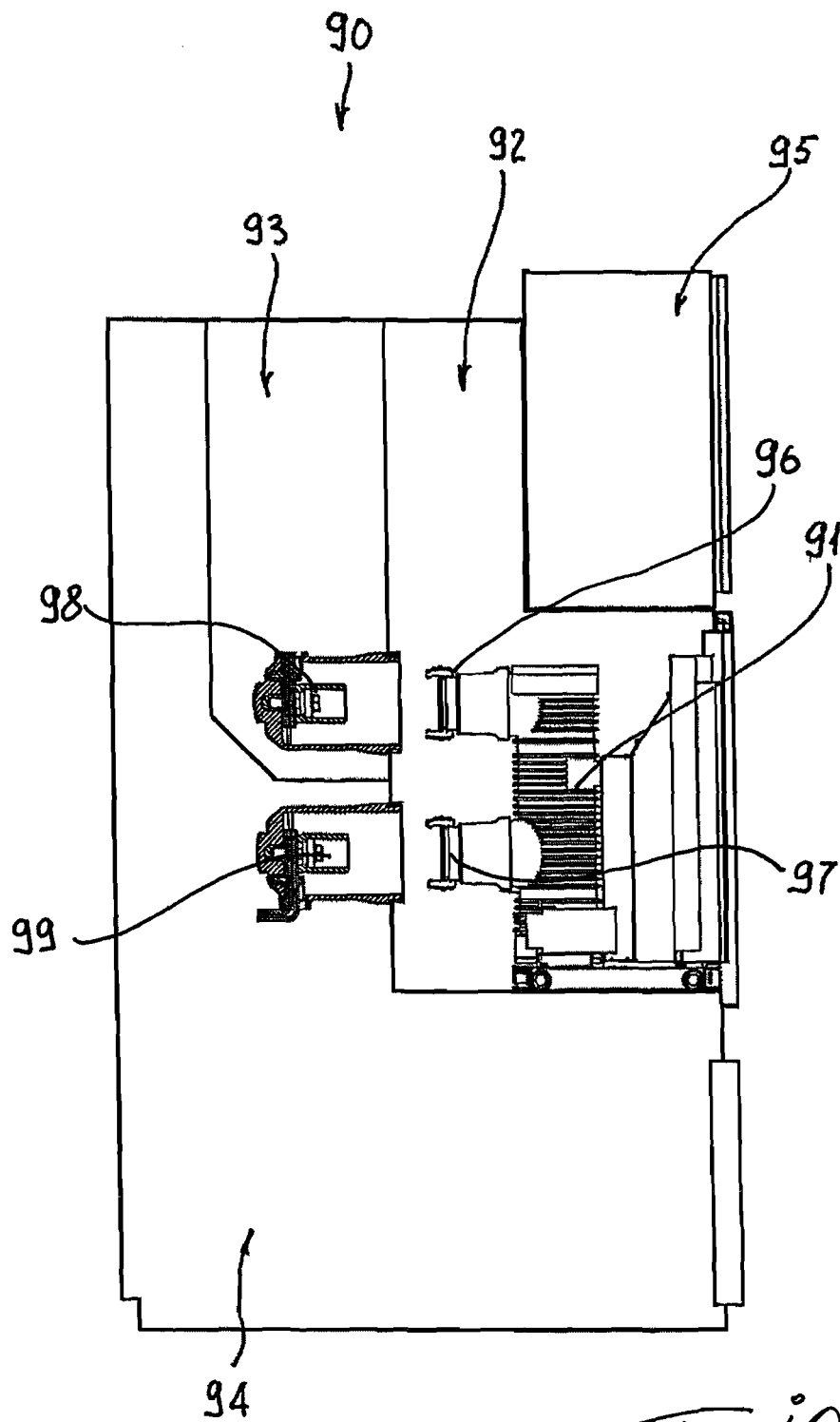
FIG. 9 is a lateral view of an example of medium voltage panel of known type.

Alternatively, as shown in FIGS. 5 and 8, the interruption unit 10 can be mounted on the first fixed conductor so as to achieve a vertical positioning in one of the three positions (A, B, or C) or during the movement between them. In particular, according to the embodiments of FIGS. 5 and 8, the interruption unit 10 achieves a vertical positioning in correspondence of the test/disconnect position (B). For the purposes of the present invention, the term vertical refers to the medium voltage switch unit when mounted in a panel in operating conditions, either floor-positioned or wall-mounted.

With reference to FIG. 8, a possible embodiment of the second drive unit 32 for the medium voltage switch unit according to the invention includes a first sliding rod 321 operatively coupled to said interruption unit 10. The sliding rod 321 can be manually or motor operated.

In particular, the first sliding rod 321 is movable between a first operative position, in which the interruption unit 10 is in said first disconnector position (A), a second operative position, in which the interruption unit 10 is in said second disconnector position (B), and a third operative position, in which the interruption unit 10 is in said third disconnector position (C). The coupling between the first sliding rod 321 and the interruption unit 10 is such as to impart to the interruption unit 10 a rotation around the pivot point 251, as a consequence of the linear movement of the sliding rod 321.

Figure 3:
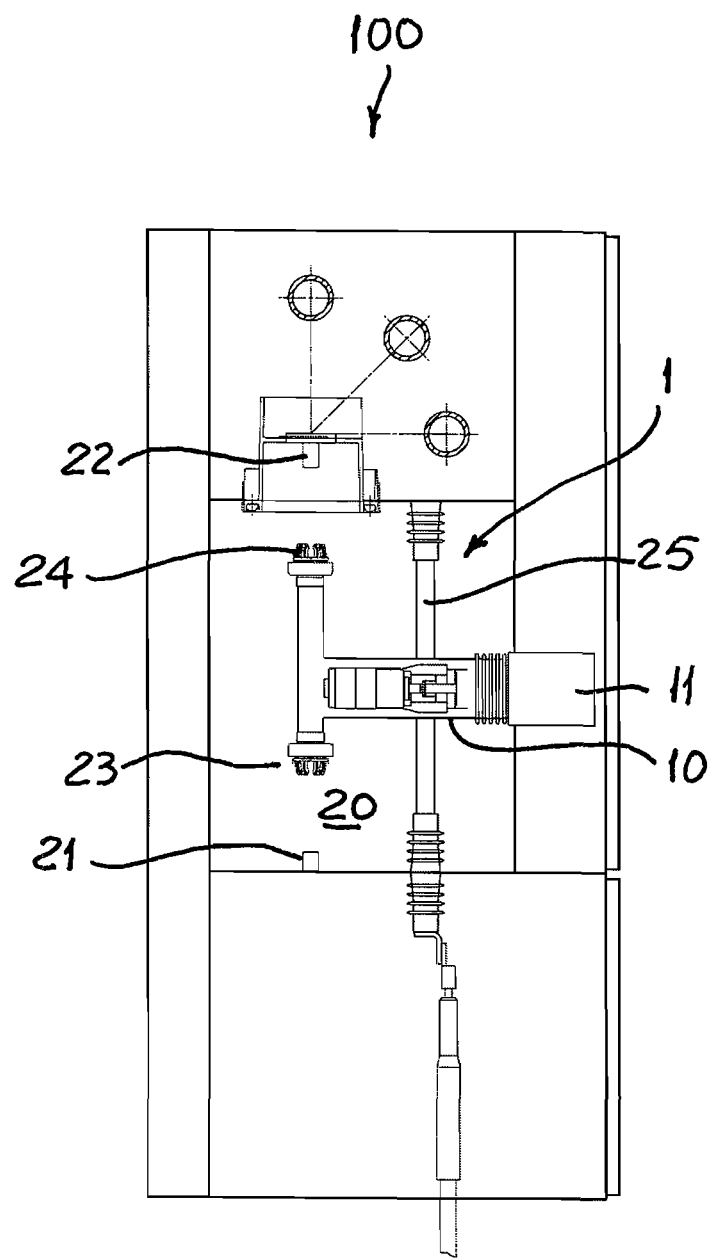
FIG. 3 is a lateral view of a second embodiment of a medium voltage switch unit according to the invention installed in a medium voltage panel.
Figure 7:
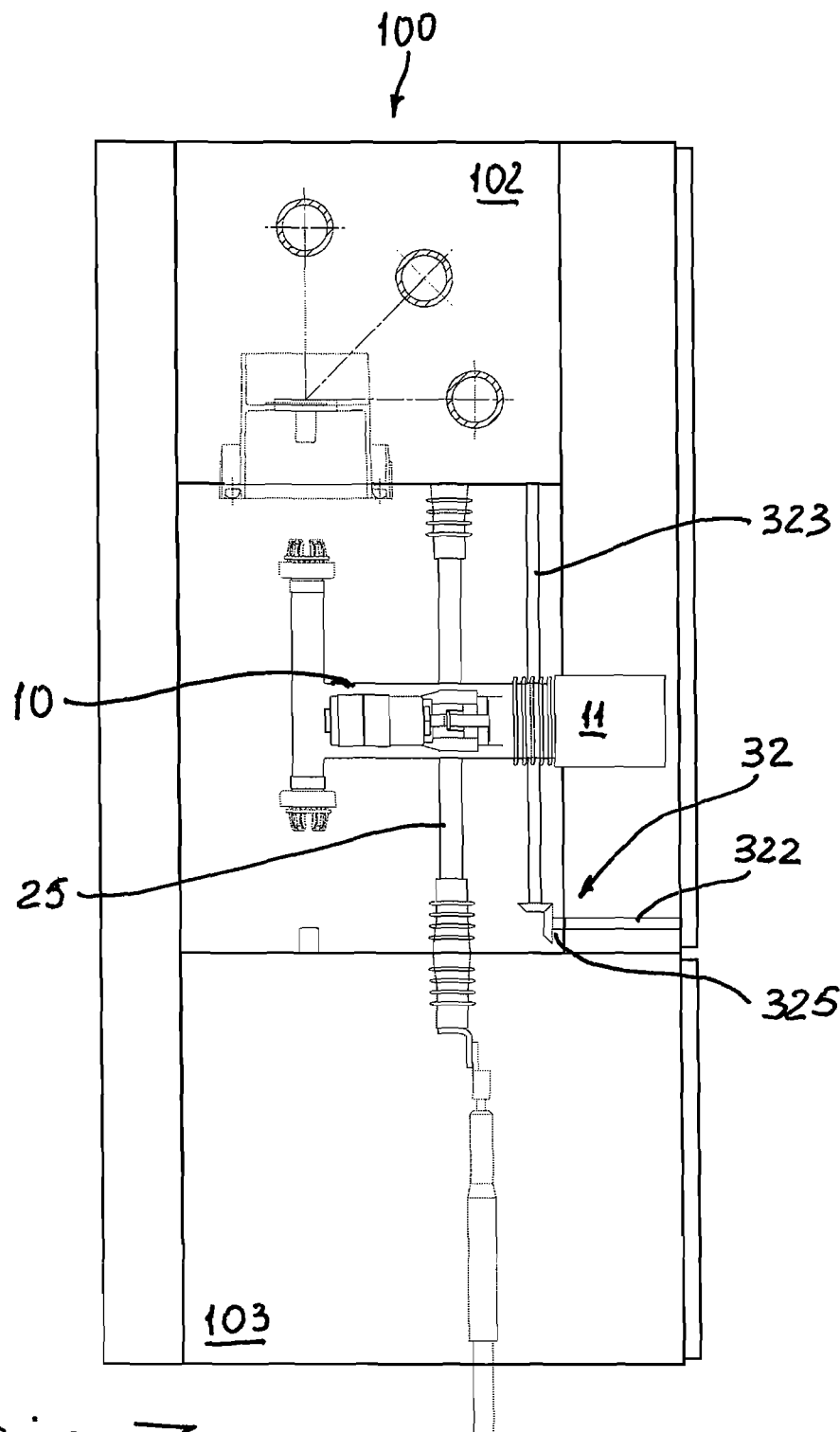
FIG. 7 is a lateral view of a first possible embodiment of a disconnection drive unit for the medium voltage switch according to the invention.

As a further alternative, embodiments of which are shown in FIGS. 3, 4, and 7, the interruption unit 10 is slidingly mounted on the first fixed conductor 25. In particular, according to this embodiment, the first fixed conductor 25 is a vertical bar onto which the interruption unit 10 can slide under electrical contact conditions, i.e. using a sliding contact at the interface between first fixed conductor 25 and interruption unit 10 so as to maintain electrical connection between the first fixed conductor 25 and the second interruption contact.

The typical operating sequence in this case is shown in details in FIG. 4. In position (A), the first movable disconnection contact 23 is coupled to the corresponding first fixed disconnection contact 21 which is grounded, while the second movable disconnection contact 24 is spaced part from the corresponding second fixed disconnection contact 22. Proper positioning and relative distance of the contacts 22 and 24 are designed so as to achieve their isolation, thereby achieving the grounded condition of the system.

By moving upwardly the interruption unit 10, it reaches position (B), in which the first and second movable disconnection contact 23 and 24 are spaced part and isolated from the corresponding first and second fixed disconnection contact 21 and 22, thereby achieving the test/disconnected condition of the system.

By further moving upwardly the interruption unit 10, this latter is then positioned in position (C), in which the second movable disconnection contact 24 is coupled to the corresponding second fixed disconnection contact 22 which is connected to a busbar system, while the first movable disconnection contact 23 is spaced part from the corresponding first fixed disconnection contact 21. Proper positioning and relative distance of the contacts 21 and 22 are designed so as to achieve their isolation, thereby achieving the service condition of the system.

In the embodiments of FIGS. 3, 4, and 7, the first fixed conductor 25 is a vertical bar and the interruption unit 10 is mounted thereon the so as to be horizontally positioned.

According to an alternative embodiment, the first fixed conductor 25 can be a horizontal bar and the interruption unit 10 is mounted thereon the so as to be vertically positioned. In this case, the three positions (A), (B), and (C) can be achieved by horizontally sliding the interruption unit 10 on the first fixed conductor 25.

With reference to FIG. 7, a further possible embodiment of the second drive unit 32 for the medium voltage switch unit according to the invention includes a second rotating rod 322 operatively coupled via a gearbox 325 to a third rod 323 operatively coupled to said interruption unit 10.

The coupling between the second rotating rod 322 and the third rod 323, as well as the coupling between the third rod 323 and interruption unit 10 is such as to impart to the interruption unit 10 sliding movement on the first fixed conductor 25, as a consequence of the rotation of the second rotating rod 322. Conveniently, the third rod 323 can be operatively coupled to said interruption unit 10 via a worm gear.

According to a particular preferred embodiment, the interruption unit 10 comprises a vacuum circuit breaker.

The Medium Voltage switch unit 1 according to the invention finds its application in Medium Voltage panels which also constitute an aspect of the present invention.

In particular, the Medium Voltage panel 100 according to the invention comprises a first compartment 101 which houses the interruption unit 10, said first 21 and second 22 fixed disconnection contacts as well as said first fixed conductor 25. Thus, the same compartment housing the interruption functionalities of the panel, also houses the disconnection functionalities thereof with great savings in terms of occupied space. Air can be conveniently used as insulating medium in the compartment 101.

The Medium Voltage panel 100 according to claim 12, then normally comprises a second compartment 102 housing the busbar system as well as a third compartment 103 housing, e.g., a cable system.

It is clear from the above that the Medium Voltage switch unit and panel of the invention have a number of advantages with respect to similar units of known type having the same functionality. In particular, it is possible to combine the interruption operations and the disconnection operations in a very compact and simplified manner without the need of having dedicated grounding switches and the related operating mechanism. This allows to reduce the number of components, thereby reducing the manufacturing, installation and maintenance costs. Its simplified construction and operating concepts allows further saving of costs, particularly in terms of copper connections normally needed in conventional panels. Moreover the overall structure of the panel can be significantly more compact with respect the panel of known type.

The switch unit and panel thus conceived may undergo numerous modifications and come in several variants, all coming within the scope of the inventive concept. Moreover, all the component parts described herein may be substituted by other, technically equivalent elements. In practice, the component materials and dimensions of the device may be of any nature, according to need and the state of the art.

The invention claimed is:

1. A Medium Voltage switch unit comprising an interruption unit and a disconnection unit, wherein the interruption unit comprises a first and a second interruption contact and a first drive unit which moves at least one of said first and second interruption contacts between a first position in which they are in electrical connection and a second position in which they are spaced apart, characterized in that said disconnection unit comprises a first and a second fixed disconnection contacts couplable and uncouplable with respective first and second movable disconnection contacts mounted on said interruption unit and electrically connected to said first interruption contact, said interruption unit being mechanically supported by a first fixed conductor and said second interruption contact being electrically connected to said first fixed conductor, the disconnection unit comprising a second drive unit which moves said interruption unit, relative to said first fixed conductor, between: a first disconnector position in which the first movable disconnection contact and the first fixed disconnection contact are coupled while the second movable disconnection contact is isolated from said second fixed disconnection contact; a second disconnector position in which said first and second movable disconnection contacts are isolated from said first and second fixed disconnection contacts; and a third disconnector position in which the second movable disconnection contact and the second fixed disconnection contact are coupled while the first movable disconnection contact is isolated from said first fixed disconnection contact.

2. The Medium Voltage switch unit according to claim 1, wherein said first fixed disconnection contact is grounded, said second fixed disconnection contact is electrically connected to a bus-bar system, and said first fixed conductor is connected to a load.

3. The Medium Voltage s switch unit according to claim 2, characterized in that said interruption unit is pivotally mounted on said first fixed conductor.

4. The Medium Voltage switch unit according to claim 3, wherein said interruption unit is rotatable around a pivot point on said first fixed conductor so as to achieve said first, second, and third position.

5. The Medium Voltage switch unit according to claim 2, characterized in that said interruption unit is slidingly mounted on said first fixed conductor.

6. The Medium Voltage switch unit according to claim 5, wherein the rotation angle of said interruption unit between said first and second position, and between said second and third position is between 20° and 30°.

7. The Medium Voltage switch unit according to claim 5, characterized in that said second drive unit comprises a first sliding rod operatively coupled to said interruption unit.

8. The Medium Voltage s switch unit according to claim 1, characterized in that said interruption unit is pivotally mounted on said first fixed conductor.

9. The Medium Voltage switch unit according to claim 8, wherein said interruption unit is rotatable around a pivot point on said first fixed conductor so as to achieve said first, second, and third position.

10. The Medium Voltage switch unit according to claim 9, wherein the rotation angle of said interruption unit between said first and second position, and between said second and third position is between 20° and 30°.

11. The Medium Voltage switch unit according to claim 10, characterized in that said second drive unit comprises a first sliding rod operatively coupled to said interruption unit.

12. The Medium Voltage switch unit according to claim 9, characterized in that said second drive unit comprises a first sliding rod operatively coupled to said interruption unit.

13. The Medium Voltage switch unit according to claim 8, characterized in that said second drive unit comprises a first sliding rod operatively coupled to said interruption unit.

14. The Medium Voltage switch unit according to claim 13, wherein said first sliding rod is movable between a first operative position, in which the interruption unit is in said first disconnector position, a second operative position, in which the interruption unit is in said second disconnector position, and a third operative position, in which the interruption unit is in said third disconnector position.

15. The Medium Voltage switch unit according to claim 1, characterized in that said interruption unit is slidingly mounted on said first fixed conductor.

16. The Medium Voltage switch unit according to claim 15, wherein said second drive unit comprises a second rotating rod operatively coupled via a gearbox to a third rod operatively coupled to said interruption unit.

17. The Medium Voltage switch unit according to claim 16, wherein said third rod is operatively coupled to said interruption unit via a worm gear.

18. A Medium Voltage panel comprising a Medium Voltage switch unit according to claim 1.

19. The Medium Voltage panel according to claim 18, wherein it comprises a first compartment housing said interruption unit, said first and second fixed disconnection contacts and said first fixed conductor.

20. The Medium Voltage panel according to claim 19, wherein it comprises a second compartment housing a busbar system and a third compartment housing a cable system.

* * * * *